US010899944B2

(12) United States Patent
Edwards (10) Patent No.: US 10,899,944 B2
(45) Date of Patent: Jan. 26, 2021

(54) POLYURETHANE UREA-CONTAINING ADIPIC ACID DIHYDRAZIDE WHERE ACTIVE HYDROGENS REACT WITH THE EPOXY GROUP FOUND ON GLYCIDOL TO FORM A DIOL (71) Applicant: Lake Region Manufacturing, Inc., Chaska, MN (US)

(72) Inventor: Peter Anthony Edwards, Jacksonville, FL (US)

(73) Assignee: Lake Region Manufacturing, Inc., Chaska, MN (US)

( * ) Notice: Subject to any disclaimer, the term of this patent is extended or adjusted under 35 U.S.C. 154(b) by 38 days.

(21) Appl. No.: 16/173,001

(22) Filed: Oct. 29, 2018

(65) Prior Publication Data
US 2020/0131399 A1    Apr. 30, 2020

(51) Int. Cl.
*C09D 175/04*    (2006.01)
*C08G 18/38*    (2006.01)
*C08G 18/75*    (2006.01)
*C08G 18/76*    (2006.01)
*C08G 18/58*    (2006.01)
*C08G 18/48*    (2006.01)
*C08G 18/34*    (2006.01)
*C08G 18/24*    (2006.01)
*C08G 18/32*    (2006.01)

(52) U.S. Cl.
CPC ......... *C09D 175/04* (2013.01); *C08G 18/246* (2013.01); *C08G 18/3203* (2013.01); *C08G 18/348* (2013.01); *C08G 18/3834* (2013.01); *C08G 18/48* (2013.01); *C08G 18/581* (2013.01); *C08G 18/757* (2013.01); *C08G 18/7621* (2013.01)

(58) Field of Classification Search
CPC .................. C09D 175/04; C08G 18/3834; C08G 18/757; C08G 18/7621; C08G 18/581; C08G 18/48; C08G 18/348; C08G 18/246; C08G 18/3203; C08G 18/4018; C08G 18/2845; C08G 18/6692; C08G 18/4238; C08G 18/4854; C08G 18/7671; C08G 18/0823; C08G 18/3262; C08G 18/4833
See application file for complete search history.

(56) References Cited

U.S. PATENT DOCUMENTS

| | | |
|---|---|---|
| 2,847,395 A | 8/1958 | Wear |
| 3,014,009 A | 12/1961 | Levine |
| 3,102,043 A | 8/1963 | Winthrop et al. |
| 3,876,506 A | 4/1975 | Dix et al. |
| 4,119,094 A | 10/1978 | Micklus et al. |
| 4,412,022 A | 10/1983 | Hirai et al. |
| 4,447,571 A | 5/1984 | Dabi et al. |
| 4,495,229 A | 1/1985 | Wolf et al. |
| 4,638,017 A | 1/1987 | Larson et al. |
| 4,713,448 A | 12/1987 | Balazs et al. |
| 4,990,357 A | 2/1991 | Karakelle et al. |
| 5,041,100 A | 8/1991 | Rowland et al. |
| 5,104,930 A | 4/1992 | Rinde et al. |
| 5,175,229 A | 12/1992 | Kehr et al. |
| 5,576,072 A | 11/1996 | Hostettler et al. |
| 5,688,855 A | 11/1997 | Stoy et al. |
| 5,749,837 A | 5/1998 | Palermo et al. |
| 5,776,611 A | 7/1998 | Elton et al. |
| 5,912,314 A | 6/1999 | Wolf |
| 5,919,570 A | 7/1999 | Hostettler et al. |
| 5,965,673 A | 10/1999 | Hermansen et al. |
| 6,172,159 B1 | 1/2001 | Gaal et al. |
| 6,706,025 B2 | 3/2004 | Engelson et al. |
| 7,193,011 B2 | 3/2007 | Kim et al. |
| 7,226,972 B2 | 6/2007 | Zhao et al. |
| 7,652,166 B2 | 1/2010 | Haubennestel et al. |
| 7,776,956 B2 | 8/2010 | Webster et al. |
| 9,255,173 B2 | 2/2016 | Edwards |
| 9,623,157 B2 | 4/2017 | Edwards |
| 9,714,361 B2 | 7/2017 | Edwards |
| 2011/0015724 A1 | 1/2011 | Köcher et al. |
| 2011/0021657 A1 | 1/2011 | Köcher et al. |
| 2011/0021696 A1 | 1/2011 | Köcher et al. |

(Continued)

FOREIGN PATENT DOCUMENTS

| | | |
|---|---|---|
| WO | 2002031021 | 4/2002 |
| WO | 2013158845 | 10/2013 |

OTHER PUBLICATIONS

Chen, et al., "Preparation of Waterborne Polyurethane Acrylate (PUA) and Application to UV-curing Coatings on the Package of Card Paper", Journal of Chemical Science and Technology, Jan. 2015, vol. 4, Issue. 1, pp. 8-15.

(Continued)

*Primary Examiner* — Sanza L. McClendon
(74) *Attorney, Agent, or Firm* — Michael F. Scalise (57) ABSTRACT A coating composition containing added diol functionality to a urethane, a urea, or polyurethane urea functional resin where an adipic acid dihydrazide chain extender, or free adipic acid dihydrazide active hydrogens react with the oxirane group found in glycidol is described. The combination of diisocyanate, a polyether segment, optionally at least one polyester diol segment, optionally at least one poly (tetrahydrofuran) diol segment, optionally and at least one dimethylol propionic acid diol segment, at least one dihydrazide segment and glycidol compound introduces an increased hydrophilic structure, by diol addition, in compositions that are usable as coatings, on for example, medical devices.

11 Claims, 4 Drawing Sheets

(56) References Cited

U.S. PATENT DOCUMENTS

2014/0275341 A1* 9/2014 Edwards .............. C09D 175/08
523/400
2016/0160078 A1* 6/2016 Edwards ............ C08G 18/0823
523/400
2016/0340545 A1* 11/2016 Edwards ............ C08G 18/4018

OTHER PUBLICATIONS

Grunlan, et al., "Waterborne Coatings with an Emphasis on Synthetic Aspects: An Overview", Department of Polymers and Coatings, North Dakota State University, Fargo, ND, 1997 American Chemical Society, Chapter 1.
Harkal, et al., "Linear glycidyl carbamate (GC) resins for highly flexible coatings", J. Coat Technol. Res.; 11 pages, Aug. 1, 2012.
May, "Epoxy Resins, Chemistry and Technology", pp. 204 to 207, 1988.
Robila, et al., "Synthesis and properties of some polyurethane anionomers with carboxylate groups", European Polymer Journal 35 (1999) pp. 1305-1311.

* cited by examiner

POLYURETHANE UREA-CONTAINING ADIPIC ACID DIHYDRAZIDE WHERE ACTIVE HYDROGENS REACT WITH THE EPOXY GROUP FOUND ON GLYCIDOL TO FORM A DIOL

BACKGROUND OF THE INVENTION

1. Field of the Invention

The present invention generally relates to polyurethane urea-containing adipic acid dihydrazide coatings where active hydrogens react with the epoxy group found on glycidol to form a diol. The polyurethane urea-based coating is particularly useful for coating medical devices, particularly a medical device that is intended to be introduced into the vasculature or into a body organ where lubricity is desired.

2. Prior Art

Waterborne polyurethane dispersions (PUD) require many processing steps but yield good properties and are beneficial for reducing volatile organic compounds (VOCs). There are many resins that are used in water dispersion chemistry. For example, see:
  a) alkyl polyurethane dispersions: see, e.g., Int. Appl. No. PCT/SG2002/000192 (WO 2002/031021) to Zeling et al. for low VOC polyol alkyd dispersion and polyurethane dispersions;
  b) hydroxyl functional latexes: see, e.g., Grulan, Melissa A.; Xing, Lin-Lin; Glass, J. Edwards. "Waterborne coatings with an emphasis on synthetic aspects: an overview." ACS Symposium Series (1997), 663 Technology for Waterborne Coatings, 1-26;
  c) U.S. Pat. No. 6,172,159 to Gaal et al., which relates to a "Water-reducible polyester resin and urethane coatings produced therefrom"; and
  d) water-soluble acrylics: See, e.g., Yingyin Chen, Jiahui Su; Lunyong Duan; Yuanpoili, Xiaoxuan Li, "Preparation of waterborne Polyurethane Acrylate (PUA) and application to U-V Curing Coatings on the Package of card Paper", Journal of Chemical Science and Technology (2015), 14 (1), 8-15.

One method to overcome the hydrophobic isocyanate group is by hydrophilic modification. For instance, an isocyanate may be modified using glycidyl carbamate oligomers, see, e.g., U.S. Pat. No. 9,623,157 to Edwards, which relates to a "Modified hyaluronate hydrophilic compositions, coatings and methods".

The partial addition to isocyanate forms a polyether for water dispersion. The reaction yields a polyurethane prepolymer with carboxylic acid groups attached: See, Robila, T.; Buruiana, T.; "Syntheses and properties of some polyurethane aniomers with carboxylate groups", European polymer Journal (1999), 35, 1305-1311.

Synthesis and formulation is both an art in chemistry and preparation. A typical PUD is based on a polyester diol mixed with dimethyl propionic acid functionality and an isocyanate. For example, see:
  a) U.S. Pat. No. 5,576,072 to Hostettler et al., which relates to a "Process for producing slippery, tenaciously adhering hydrogel coatings";
  b) U.S. Pat. No. 4,990,357 to Karakelle et al., which relates to "Elastomeric segmented hydrophilic polyetherurethane based lubricious coatings";
  c) U.S. Pat. No. 6,706,025 to Engelson et al., which relates to "Lubricous catheters";
  d) U.S. Pat. No. 7,776,956 to Webster et al., which relates to "Elastomeric segmented hydrophilic polyurethane based coatings";
  e) U.S. Pat. No. 4,119,094 to Micklus et al., which relates to a "Coated substrate having a low coefficient of friction hydrophilic coating and a method of making the same";
  f) U.S. Pat. No. 4,495,229 to Wolf et al., which relates to "One component heat curing polyurethane coatings stable in storage";
  g) U.S. Pat. No. 4,638,017 to Larson et al., which relates to a "Hydrophilic polyurethane polyurea sponge";
  h) U.S. Pat. No. 4,713,448 to Balazs et al., which relates to "Chemically modified hyaluronic acid preparation";
  i) U.S. Pat. No. 5,041,100 to Rowland et al., which relates to a "Catheter and hydrophilic friction-reducing coating thereon";
  j) U.S. Pat. No. 5,749,837 to Palermo et al., which relates to an "Enhanced lubricity guidewire";
  k) U.S. Pat. No. 5,912,314 to Wolf, which relates to a "Reaction product of mixed uretdiones and a disecondary diamine";
  l) U.S. Pat. No. 5,919,570 to Hostettler et al., which relates to "Slippery, tenaciously adhering hydrogel coatings containing a polyurethane-urea polymer hydrogel comingled with a poly(n-vinylpyrrolidone) polymer hydrogel, coated polymer and metal substrate materials, and coated medical devices";
  m) U.S. Pat. No. 7,193,011 to Kim et al., which relates to a "Method of preparing water dispersible poly(urethane urea) having aromatic-aliphatic isocyanate";
  n) U.S. Pat. No. 7,226,972 to Zhao et al., which relates to a "Process for crosslinking hyaluronic acid to polymers";
  o) U.S. Pat. No. 7,652,166 to Haubennestel et al., which relates "Biuret compounds, their preparation and use, and intermediates in their preparation";
  p) U.S. Pat. No. 5,104,930 to Rinde et al., which relates to "Polyurea gel compositions and articles therefrom";
  q) U.S. Pat. No. 5,175,229 to Braatz et al., which relates to "Biocompatible polyurea urethane hydrated polymers";
  r) U.S. Pat. No. 5,688,855 to Stoy et al., which relates to "Thin film hydrophilic coatings";
  s) U.S. Pat. No. 5,776,611 to Elton et al., which relates to "Crosslinked hydrogel coatings"; and
  t) U.S. Pub. No. 2011/0015724 to Kocher et al., which relates to a "Medical device having hydrophilic coatings"; and
  u) U.S. Pub. No. 2011/0078832 to Kocher, which relates to "Hydrophilic polyurethane solutions".

The addition of glycidol to form linear glycidyl carbamates is described. For example, see Umesh D. Harkal, Andrew J. Muehlberg, Dean C. Webster, "Linear glycidyl carbamate (GC) resins for highly flexible coatings," J. Coat. Res., 10(2), 141-151 (2012).

Also, a discussion regarding water soluble hydrophilic glycidyl carbamates is found in U.S. Pat. No. 9,714,361 to Edwards, which is titled "Oxirane (ethylene oxide) polyurethane coatings".

Hydrazides and hydrazides of carboxylic acids have been used as latent curing agents for epoxy resins. For example, see:
  a) (Lee and Neville, "Handbook of Epoxy Resins" McGraw-Hill Book Company, New York, 1967;

b) "Encyclopedia of Polymer Science and Technology", John Wiley & Sons, Inc., Vol. 6, 235 (1967); and
c) U.S. Pat. Nos. 3,014,009, 3,102,043, and 2,847,395.

Dihydrazides cure through the primary amine to form urea as a chain extender. For example, see:
a) U.S. Pat. No. 4,447,571 to Dabi et al., which relates to "Stabilization of polyurethanes", and
b) U.S. Pat. No. 4,412,022 to Hirai et al., which relates to "Polyurethane compositions prepared from a polymeric diol".

Dihydrazides react with epoxy via four active hydrogens. For example, see:
a) U.S. Pat. No. 2,847,395 to Wear, which relates to "Stable heat-curing epoxy resin compositions", and
b) U.S. Pat. No. 5,965,673 to Hermansen et al., which relates to "Epoxy terminated prepolymer of polyepoxide and diamine with curing agent".

Finally, U.S. Pat. No. 9,714,361 to Edwards (hereafter "the '361 patent"), which relates to a water loving coating (hereafter referred to as "WLC") comprising a polyurethane epoxy alkylene oxide. While the prior art WLC of the '361 patent is particularly useful as a lubricious coating on a medical device that is intended for introduction into the vasculature, and the like, there is a desire for an improved WLC that contains diol crosslinking functionality. The present polyurethane-chain extended or free form dihydrazide which is modified by reacting with a glycidol fulfils this need.

SUMMARY OF THE INVENTION

Synthesis reactions can be optimized by running them at relatively lower temperatures. Since reaction order is a very important consideration in developing new coatings, it is known that low temperature reactions tend to reduce undesirable side reactions. In the case of polyurethane urea-based coatings, diisocyanate is desirably either a liquid or a melted solid before addition of a polyol, and dihydrazide is desirably fully chain extended or in free form before addition of a dibutyltin dilaurate catalyst and glycidol. Adding glycidol in the presence of dihydrazide results in amine-like reactions with, for example, adipic acid dihydrazide with glycidol to form a diol. However, adding a catalyst too early may alter the chain extending network and form a less desirable coating. Polyurethane, polyurea or polyurethane urea, which contain adipic acid dihydrazide active hydrogens, have been found to react with the epoxy group contained in glycidol.

Figure 1:
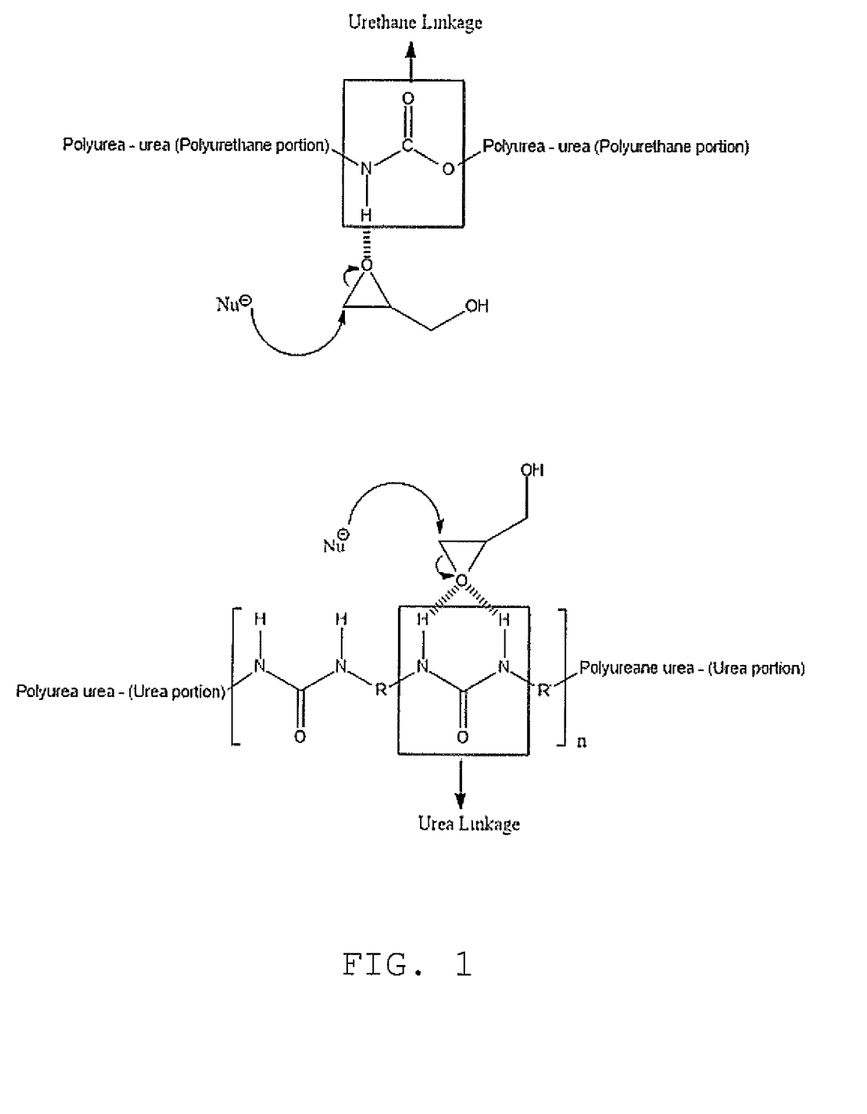
FIG. 1 illustrates two schematics of an autocatalyzed reaction from hydrogen bonding of an adipic acid dihydrazide active hydrogen and glycidol leading to nucleophilic attack on a urethane portion (top) and urea portion (bottom).

Accordingly, the present invention occurs via an increased exotherm from glycidol addition during synthesis. As depicted in FIG. 1, the addition of glycidol is described as: adipic acid dihydrazide (Nu⁻), follows an autocatalyzed reaction where protons of the active hydrogens in the compound pull electrons from glycidol. The electropositive character of the epoxy group's alpha carbon therefore catalyzes the reaction via nucleophilic (Nu⁻) attack. The kinetics of glycidyl carbamates and attack of oxirane via a nucleophile has been previously described by Peter A. Edwards in "Glycidyl Carbamate Resins to Achieve Polyurethane Properties," North Dakota State University of Agriculture and Applied Science, PhD Thesis., 101 (2004). Depending on the amount of glycidol added for each embodiment of the present invention, the open hydroxyl groups then react with excess isocyanate, or added isocyanate to form a slightly crosslinked network.

Figure 2:
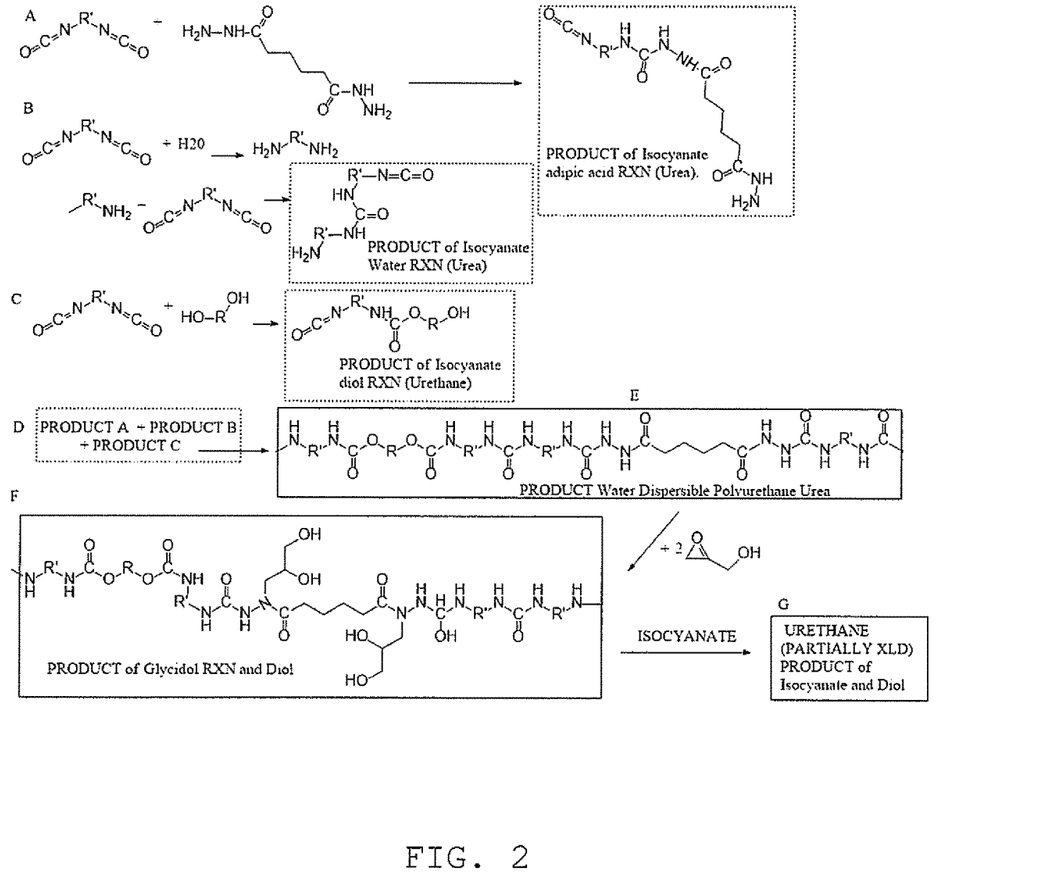
FIG. 2 is a schematic of the first embodiment of the present invention showing:
  isocyanate reaction with adipic acid dihydrazide to form a urea (product A);
  an isocyanate reaction with water to form a diamine that reacts with isocyanate to form urea (product B);
  an isocyanate reaction with diol to form urethane (product C);
  reaction of (D or (A+B+C)) that is a water dispersible polyurethane urea (product E);
  chain extended reactions with glycidol to form a diol (product F); and,
  the reaction product of the diol with isocyanate to form a partially crosslinked urethane (product G).

Two embodiments of the present invention are described:
The first embodiment of the present invention relates to a polyurethane urea chain extended dihydrazide where an active hydrogen reacts with the epoxy group found on glycidol to form a diol. The diol is then reactive, during synthesis, if excess or added isocyanate is present (FIG. 2).

Figure 3:
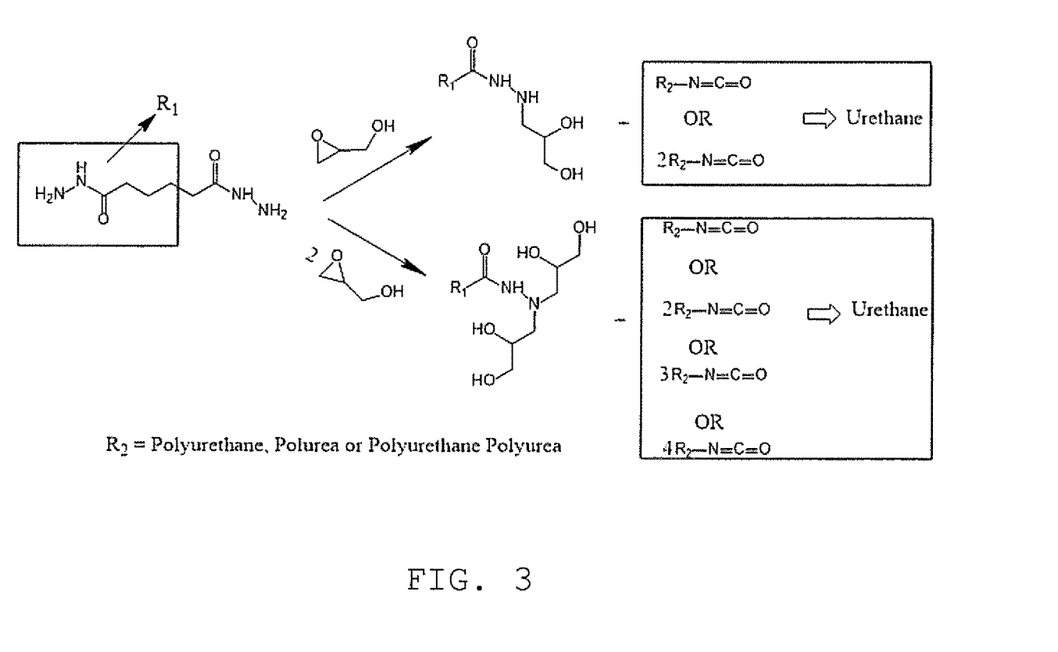
FIG. 3 is a schematic of the second embodiment of the present invention showing adipic acid dihydrazide free form reactions with glycidol to form a diol. Isocyanate can further react with the diol to form a urethane.

The second embodiment of the present invention relates to a polyurethane urea where unreacted, or free, dihydrazide active hydrogens react with the epoxy group found on glycidol to form a diol. The diol is then reactive, during synthesis, if excess or added isocyanate is present (FIG. 3).

Figure 4:
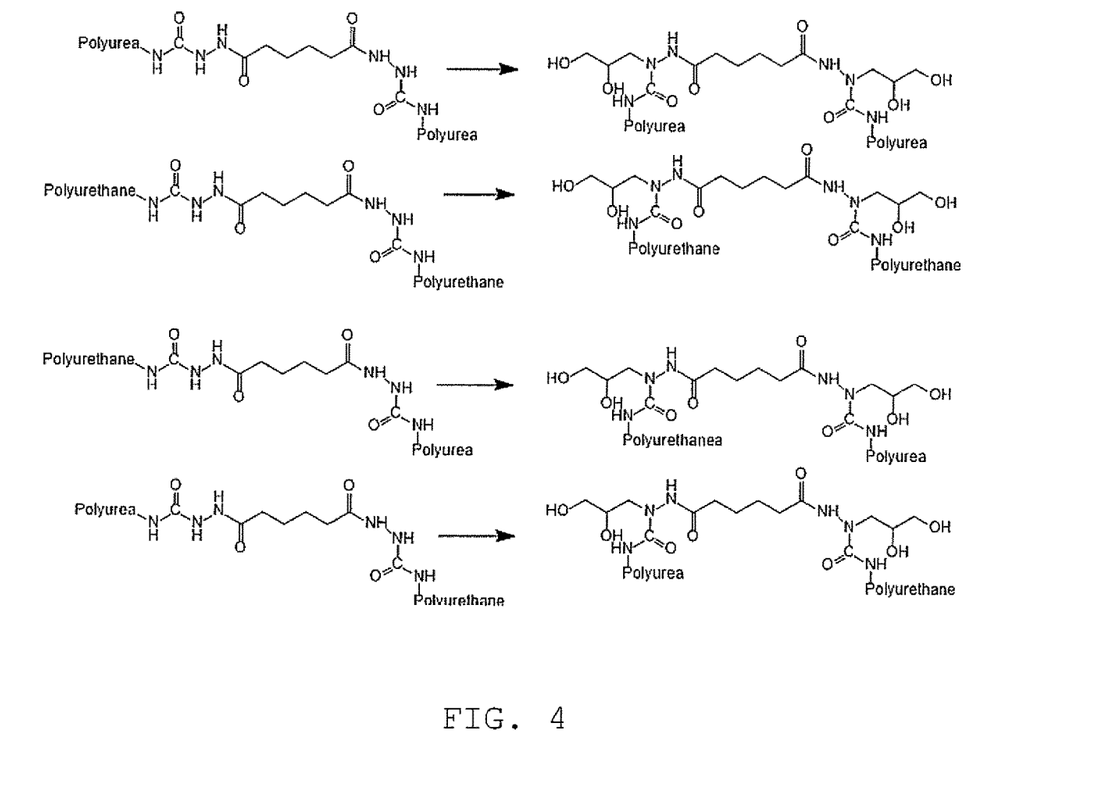
FIG. 4 illustrates various polyurea and polyurethane adipic acid dihydrazide chain extended reactions with glycidol to form a diol, which can be indexed for desired properties.

FIG. 4 illustrates various variations of polyurethane, polyurea and polyurethane polyurea structures that may exist. Indexing of the polyurethane: urea effects physical and mechanical properties.

Other features, objects, and advantages of the present invention will become more apparent to those of ordinary skill in the art after having read the following detailed description. It should be understood, however, that the detailed description, while indicating preferred embodiments of the present invention, is given by way of illustration only, not limitation. Various changes and modifications within the scope of the present invention will become apparent to those skilled in the art.

The present invention will now be described in connection with preferred embodiments, however, it is understood that there is no intent to limit the invention to the embodiments described. On the contrary, the intent is to cover all alternatives, modifications, and equivalents as may be included within the scope of the invention as defined by the appended claims.

DETAILED DESCRIPTION OF THE PREFERRED EMBODIMENTS

Unless otherwise indicated, the present invention is not limited to specific reactants, substituents, catalysts, catalyst compositions, resin compositions, reaction conditions, and the like, as they may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "a diisocyanate" includes a single diisocyanate as well as a combination or mixture of two or more diisocyanates, reference to "a diol" encompasses a single diol as well as two or more diols, and the like.

As used in the specification, the terms "for example," "for instance," "such as," or "including" are meant to introduce examples that further clarify more general subject matter. Unless otherwise specified, the examples described hereinafter are provided only as an aid in understanding the present invention and are they not meant to be limiting in any manner.

"Optional" or "optionally" means that the subsequently described circumstance may or may not occur, so that the description includes instances where the circumstance occurs and instances where it does not.

In this specification and in the claims that follow, reference will be made to a number of terms, which shall be defined to have the following meanings:

The term "polyurethane" means a polymer with urethane linkages.

The term "polyurea" means a polymer with urea linkages.

The term "polyurethane urea" means a polymer with urethane and urea linkages, which is often denoted as polyurethane.

A polyurethane urea chain extended dihydrazide where active hydrogens react with the epoxy group found on glycidol to form a diol that is water dispersible, lubricious and durable.

A diisocyanate compound has the following structure:

The diisocyanate is not limited to a specific divalent group R linking the two isocyanates in the molecule. Instead, R is selected from a divalent group, including, for example, aromatic, aliphatic and cyclic structures.

Diisocyanates that may be used in the present invention include, but are not limited to, hexamethylene diisocyanate (HDI), trimethyl hexamethylene diisocyanate (TMDI), dicyclohexyl diisocyanate ($H_{12}$MDI), isophorone diisocyanate (IPDI), 4,4'-methylene diphenyl diisocyanate (4,4'-MDI), 2,2'-methylene diphenyl diisocyanate (2,2'-MDI), 2,4'-methylene diphenyl diisocyanate (2,4'-MDI), 1,3-phenylene diisocyanate, 1,4-phenylene diisocyanate, 1,4-cyclohexyl diisocyanate, meta-tetramethylxylylene diisocyanate (meta-TMXDI), 2,4-toluene diisocyanate (TDI), 2,6-toluene diisocyanate (TDI), and mixtures thereof.

A diol compound has the following structure:

The diol is not limited by a specific divalent group R' linking the hydroxyl groups in the molecule. Instead, R', just as with R above for a diisocyanate compound, is selected from a divalent group, including, for example, an aromatic, an aliphatic, and a cyclic structure. In addition, R' may be a divalent ether group. Additionally, R' may be replaced with any number of substituents or functional moieties. Examples include a polyether diol segment, a polyester diol segment, a poly(tetrahydrofuran) diol segment, and a dimethylol propionic acid diol segment.

A dihydrazide compound has the following structure:

The dihydrazide is not limited to a specific divalent group R" linking the hydrazide groups in the molecule. Instead, R" is selected from a divalent hydrocarbyl group, including, for example, an aromatic, an aliphatic, and a cyclic structure.

Dihydrazides that are useful in the present invention include, but are not limited to, adipic acid dihydrazide, isophthalic dihydrazide, sebasic acid dihydrazide, ajicure LDH, ajicure VDH, aaline dihydrazide, carbodihydrazide and icosanedioic acid dihydrazide.

A polyurethane urea chain extended adipic acid dihydrazide where active hydrogens react with the glycidol epoxy group to form a diol according to the present invention can be prepared by a variety of methods. Suitable methods generally comprise reacting at least one polyether diol segment, optionally at least one polyester diol segment, more optionally at least one poly(tetrahydrofuran) diol segment, still more optionally at least one dimethylol propionic acid diol segment, with at least one dihydrazide segment, and a glycidol compound according to the present invention.

As a non-limiting example, the polyurethane urea chain extended adipic acid dihydrazide where active hydrogens react with the epoxy group found on glycidol to form a diol compound according to the present invention can be prepared by combining at least one polyester diol segment, at least one polyether diol segment, at least one dimethylol propionic acid diol segment, and at least one poly(tetrahydrofuran) diol segment in the presence of at least one solvent. A suitable solvent mixture is water, an aprotic solvent, propylene glycol methyl ether acetate (PMA), and optionally, at least one catalyst, such as dibutyltindilaurate (DBTDL).

According to the present invention, a diisocyanate is first heated to its melting temperature before adding at least one of the polyester diol segment, the polyether diol segment, the dimethylol propionic acid diol segment, and the dihydrazide segment and glycidol. The reaction is mixed with a solvent before addition of the dihydrazide. At least one optional catalyst may then be added after the completion of mixing. Glycidol is added before or after the catalyst.

Additionally, glycidol, PEO (polyethylene oxide), dimethylol propionic acid (DMPA), polytetrahydrofuran (poly-THF), and poly [di(ethylene glycol)adipate] (PDEGA hydroxyl) can be reacted with 4,4'-methylenebisdiisocyanate for chain extension and providing relatively soft segments. Adipic acid dihydrazide (AAD) active hydrogen reacts with isocyanate for chain extension. Adipic acid dihydrazide can also react with glycidol to form a diol. Reaction kinetics are faster with an aromatic group next to the isocyanate. The monomers and oligomers (including the genericized polymer constituents) and the synthetic route noted about was used to produce coatings/compositions of the present invention.

The polyurethane, polyurea, polyurethane urea chain extended adipic acid dihydrazide of embodiment 1 (FIG. 2), or the free adipic acid dihydrazide, where active hydrogens react with the epoxy group found on glycidol of embodiment 2 (FIG. 3) both form diol coatings that are lubricous and durable.

According to the present invention, the primary reactions that make up the polyurethane coatings are listed below:

Reaction 1:

FIG. 1 illustrates the addition of glycidol is described as: adipic acid dihydrazide (Nu⁻), follows an autocatalyzed reaction where protons of the active hydrogens in the compound pull electrons from glycidol. The electropositive character of the epoxy group's alpha carbon therefore catalyzes the reaction via nucleophilic (Nu⁻) attack. As depicted, urea hydrogen bond strength is roughly twice that of a urethane, this generates stronger electropositive charge at the oxirane's alpha carbon when compared to the polyurethane.

Reaction 2:

FIG. 2 illustrates polyurethane urea chain extended adipic acid dihydrazide where active hydrogens react with the epoxy group found on glycidol to form a diol.

Reactive coating compositions are an extremely lubricious and durable coatings containing both relatively hard and relatively soft segments i.e., crystalline and amorphous segments. This structure contains polyurethane, urea, polyurethane urea groups. This is a modified aqueous and solvent soluble/dispersion material that employs urea formation to increase physical crosslinks via hydrogen bonding. Carboxylic acid functionality in the polymer backbone and diol/polyol end groups add crosslinking sites. Product A is a urea formed from the reaction of isocyanate and adipic acid dihydrazide. The reaction of isocyanate forms an unstable carbamic acid that forms an amine. The amine quickly reacts with isocyanate functionality to form a urea (product B). Reactions of isocyanate and diol form a urethane (product C). A water dispersible polyurethane urea is formed by reactants (D or (A+B+C), which the product contains active hydrogens to form (product E). These active hydrogens react with glycidol to form a diol (product F). The diol is then reactive to excess or added isocyanate to form product G.

Desirably, the polyurethane urea chain extended adipic acid dihydrazide where active hydrogens react with the epoxy group found on glycidol to form a diol is water soluble and water dispersible. Further, these reactive compositions are extremely lubricious and durable coatings that contain both relatively hard and relatively soft segments. The structure contains polyurethane, polyurea or polyurethane urea and epoxy groups that are reacted with dihydrazide resulting in a diol. The diol can further react with isocyanate to form a urethane having a slightly crosslinked network (product G). The amount of crosslinking is dependent on the amount of glycidol that is added. The excess adipic acid dihydrazide left over after the reaction with glycidol to form a diol can be further reacted with a crosslinking compound to establish greater crosslinking. This is a modified aqueous and solvent soluble material with increased physical crosslinks via hydrogen bonding. The structure relies on physical crosslinks for strength through relatively hard segment domains. The hard segments contain aromatic groups, which also stack by pi-bond interactions.

Reaction 3:

FIG. 3 illustrates polyurethane urea free adipic acid dihydrazide where active hydrogens react with the epoxy group found on glycidol to form a diol/(no addition of water).

Not adding water makes the adipic acid insoluble. This provides free reactive dihydrazide groups. It is postulated that the reaction occurs at the adipic acid/dihydrazide particle interface. Also, the water reaction is limited with MDI isocyanate, and release of $CO_2$ is minimal when forming an amine that results in urea. The reactive compositions are extremely lubricious and durable coatings that contain both relatively hard and relatively soft segments. The structure contains polyurethane, urea, and diol/polyol groups. Urea and hard segments yield an increase in hydrogen bonding for physical crosslinks and carboxylic acid functionality in the polymer backbone while the diol end groups add crosslinking.

The structure of polyurethane urea-containing free adipic acid dihydrazide active hydrogens that react with the epoxy group found on glycidol to form a diol is water dispersible, lubricious and durable. The diol can further react with isocyanate to form a urethane as a slightly crosslinked network. The amount of crosslinking is dependent on the amount of glycidol that is added. Excess adipic acid dihydrazide after completion of the reaction with glycidol to form a diol can be further reacted by chain extension, or with a crosslinker to establish greater crosslinking. The resulting reactive compositions are extremely lubricious and durable coatings that contain both relatively hard and relatively soft segments. This is a modified aqueous and solvent soluble material that increases physical crosslinks via hydrogen bonding. The physical crosslinks provide increased strength through hard segment domains. The hard segment domains contain aromatic groups, which also stack by pi-bond interactions.

Reaction 4:

FIG. 4 illustrates various polyurea and polyurethane adipic acid dihydrazide chain extended reactions with glycidol to form a diol. Upon glycidol addition, hydrogen bonds form that result in a viscosity increase and a notable reaction exotherm. Hydroxyl functionality generated from the diol can further react with isocyanate to form a partially crosslinked urethane (dependent on the amount of glycidol added and free isocyanate available). After coating syntheses is complete and formulated, addition of an appropriate reactive external crosslinker bonds with open diol functionality (or DMPA carboxylic acid functionality) to increase durability. Hydrogen bonding (physical bonding) of these systems are very strong and covalent crosslinkers are optional. One skilled in the art can tailor desired lubricity and durability based off polyurethane/polyurea indexing and optional external crosslinker.

Example 1

This example describes the preparation of a polyurethane urea chain extended adipic acid dihydrazide where active hydrogens react with the epoxy group found on glycidol to form a diol according to the present invention.

Charge 0.4395 equivalents of 4,4' methylenebis(phenyl isocyanate) (MDI) 98% into a 2 L jacketed reaction vessel fitted with a Huber Tango Controller. Set the Huber controller to 40° C. to slightly melt/soften the 4,4' methylenebis (phenyl isocyanate) 98%. Apply dry nitrogen flow. Then, charge the reactor with: (1) 0.0774 equivalents poly(diethylene glycol) adipate (PDEGA), average molecular number ~2500, (2) 0.0945 equivalents poly(tetrahydrofuran) (THF), average molecular number ~2900, and (3) 0.0845 equivalents 2,2-bis(hydroxymethyl)propionic acid (DMPA).

Once the desired temperature is obtained, add 0.0124 equivalents poly(ethylene oxide) (PEO), average molecular viscosity ~100,000, then incorporate by solid mixing. Once fully incorporated, add 500 grams propylene glycol methyl ether acetate (~0.005-5.0% water) and mix the resin slurry at a moderate mix speed followed by cooling to 8° C. at a slow ramp rate. When the desired temperature is reached, add 0.0351 equivalents adipic acid dihydrazide and mix until fully incorporated. Once fully incorporated, increase the temperature to 40° C. at a slow ramp rate. During this ramp, when the Huber controller reaches 30° C., add 887.00 grams anhydrous NMP solvent, then rapidly mix to incorporate the solvent. Maintain the anhydrous NMP solvent Huber temperature at 40° C. During heating ramp, as the Huber temperature reaches 35° C., add 31 drops DBTL and mix rapidly to fully incorporate the catalyst into the reaction vessel. Once incorporated, add 0.0041 equivalents glycidol and adjust mixer for rapid mixing while maintaining the adipic acid/glycidol exotherm with the Huber Controller. Then, increase the temperature to 50° C. isothermally for 4 days without mixing, or until reaction is complete.

The reactants for Example 1 are listed in Table 1 below.

TABLE 1

| Reactants | MW | F | Eq. wt. | Grams | Equivalents | NCO: Reactant |
|---|---|---|---|---|---|---|
| MDI | 250.25 | 2 | 125.125 | 54.99 | .4395 | .4395 |
| THF | 2,900.00 | 2 | 1450. | 137 | .0945 | 0.5858 |
| PDEGA | 2,500.00 | 2 | 1250. | 96.79 | .0774 | |
| Adipic Acid Dihydrazide | 174.2 | 4 | 43.55 | 6.11 | .0351 | |
| DMPA | 134.13 | 2 | 67.065 | 5.67 | .0845 | |
| Glycidol | 74.079 | 1 | 74.079 | 0.3 | .0041 | |
| PEO | 100,000 | 2 | 50000 | 620 | .0124 | |
| Water | 18 | 1 | 18 | 5 (0.005-5.0%) | .2500 | |

Example 2

This example describes the preparation of an inventive polyurethane urea free adipic acid dihydrazide where active hydrogens react with the epoxy group found on glycidol form a diol according to the present invention.

Charge 0.4395 equivalents of 4,4' methylenebis(phenyl isocyanate) (MDI) 98% into a 2 L jacketed reaction vessel fitted with a Huber Tango Controller. Set the Huber controller to 40° C. to slightly melt/soften the 4,4' methylenebis(phenyl isocynate) 98%. Apply a dry nitrogen flow. Charge the reactor with: (1) 0.0774 equivalents poly(diethylene glycol) adipate (PEDGA), average molecular number ~2500, (2) 0.0945 equivalents poly(tetrahydrofuran) (THF), average molecular number ~2900, and (3) 0.0845 equivalents 2,2-bis(hydroxymethyl)propionic acid (DMPA).

Once the desired temperature is obtained, add 0.0124 equivalents poly(ethylene oxide) (PEO), average molecular viscosity ~100,000, then incorporate by solid mixing. Once fully incorporated, add 500 grams of anhydrous NMP and mix the resin slurry at a moderate mix speed, then cool to 8° C. at a slow ramp rate. When the desired temperature is reached, add 0.0351 equivalents adipic acid dihydrazide and mix until fully incorporated. Once fully incorporated, increase the temperature to 40° C. at a slow ramp rate. During this ramp, when the Huber controller reaches 30° C., add 887.00 g anhydrous NMP solvent, then rapidly mix to incorporate the solvent. Maintain the anhydrous NMP solvent Huber temperature at 40° C. During the heating ramp, as the Huber temperature reaches 35° C., add 31 drops DBTL and mix rapidly to fully incorporate the catalyst into the reaction vessel. Once incorporated, add 0.0041 equivalents glycidol and adjust the mixer for rapid mixing while maintaining the adipic acid/glycidol as exothermic with the Huber Controller. Increase the temperature to 50° C. isothermally for 4 days without mixing, or until reaction is complete.

The reactants for Example 2 are listed in Table 2 below.

TABLE 2

| Reactants | MW | F | Eq. wt. | Grams | Equivalents | NCO: Reactant |
|---|---|---|---|---|---|---|
| MDI | 250.25 | 2 | 125.125 | 54.99 | .4395 | .4395 |
| THF | 2,900.00 | 2 | 1450. | 137 | .0945 | 0.308 |
| PDEGA | 2,500.00 | 2 | 1250. | 96.79 | .0774 | |
| Adipic Acid Dihydrazide | 174.2 | 4 | 43.55 | 6.11 | .0351 | |
| DMPA | 134.13 | 2 | 67.065 | 5.67 | .0845 | |
| Glycidol | 74.079 | 1 | 74.079 | 0.3 | .0041 | |
| PEO | 100,000 | 2 | 50000 | 620 | .0124 | |

Analytical Analysis

A resin sample of an aqueous polyurethane polymer was submitted to NSL Analytical Laboratories for characterization of the polymer. Various Mass Spectrometry techniques were utilized in this characterization including Electro-Spray Ionization (ESI), Matrix Assisted Laser Desorption Ionization (MALDI) and Chemical Ionization (CI). When adipic acid dihydrazide is used as a chain extender, or in free form, glycidyl signals are not found in the Mass spectra.

Although two examples of the present invention have been described in detail, for purposes of illustration, various modifications of each embodiment may be made without departing from the scope of the present invention. Accordingly, the present invention is not to be limited, except as by the appended claims.

What is claimed is:

1. A polyurethane urea chain extended adipic acid dihydrazide diol coating as a reaction product of the following reactants:
   a) a diisocyanate;
   b) a polyether diol;
   c) adipic acid dihydrazide;
   d) glycidol; and
   e) water, which is in excess with respect to the diisocyanate and with respect to the glycidol.

2. The coating of claim 1, wherein the reaction product further comprises at least one of the following additional reactants:
   f) a polyester diol;
   g) a poly(tetrahydrofuran) diol; and
   h) a dimethylol propionic acid diol.

3. The coating of claim 1, wherein the adipic acid dihydrazide is in excess with respect to the glycidol.

4. The coating of claim 1, wherein the reaction product further comprises the following reactants:
   f) a polyester diol;
   g) a poly(tetrahydrofuran) diol; and
   h) a dimethylol propionic acid, and
   wherein adipic acid dihydrazide is in excess with respect to glycidol.

5. The coating of claim 4, wherein the reaction product further comprises the following reactants:
   i) acid moieties that result from the dimethylol propionic acid;
   j) urea moieties that result from reaction of the diisocyanate and adipic acid dihydrazide; and
   k) diol moieties that result from reaction of adipic acid dihydrazide and glycidol.

6. A polyurethane urea chain extended adipic acid dihydrazide diol coating as a reaction product of the following reactants:
   a) a diisocyanate;
   b) a poly(ethylene oxide);
   c) a poly[di(ethylene glycol) adipate];
   d) a poly(tetrahydrofuran) diol;
   e) dimethylol propionic acid;
   f) adipic acid dihydrazide;
   g) glycidol; and
   h) water, which is in excess with respect to the diisocyanate and with respect to the glycidol.

7. The coating of claim 6, wherein the adipic acid dihydrazide is in excess with respect to the glycidol.

8. The coating of claim 6, wherein the reaction product further comprises the following reactants:
   i) acid moieties that result from dimethylol propionic acid;
   j) urea moieties that result from reaction of the diisocyanate and adipic acid dihydrazide; and
   k) diol moieties that result from reaction of adipic acid dihydrazide and glycidol.

9. The coating of claim 6, wherein the reaction product further comprises the following reactant:
   l) a polyester diol, and
   wherein the adipic acid dihydrazide is in excess with respect to the glycidol.

10. The coating of claim 6, wherein the diisocyanate is selected from the group of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphtalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof.

11. The coating of claim 1, wherein the diisocyanate is selected from the group of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphtalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof.

\* \* \* \* \*